(12) United States Patent
Allen et al.

(10) Patent No.: US 8,291,136 B2
(45) Date of Patent: Oct. 16, 2012

(54) RING BUFFER

(75) Inventors: Joseph H. Allen, Cambridge, MA (US); David J. Hoeweler, Cambridge, MA (US); John A. Shriver, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 12/629,445

(22) Filed: Dec. 2, 2009

(65) Prior Publication Data

US 2011/0131352 A1    Jun. 2, 2011

(51) Int. Cl.
    *G06F 3/00* (2006.01)
(52) U.S. Cl. .............. 710/52; 710/53; 710/54; 710/55; 710/56; 710/57
(58) Field of Classification Search .................. None
    See application file for complete search history.

(56) References Cited

U.S. PATENT DOCUMENTS

| | | | | |
|---|---|---|---|---|
| 4,809,217 A | * | 2/1989 | Floro et al. .................. | 710/52 |
| 4,839,791 A | * | 6/1989 | Ito ............................... | 710/56 |
| 5,299,313 A | * | 3/1994 | Petersen et al. ............. | 709/234 |
| 5,404,166 A | * | 4/1995 | Gillard et al. ............... | 348/390.1 |
| 5,584,038 A | * | 12/1996 | Papworth et al. ........... | 712/23 |
| 5,754,764 A | * | 5/1998 | Davis et al. ................. | 709/200 |
| 5,765,187 A | * | 6/1998 | Shimizu et al. ............. | 711/110 |
| 5,978,868 A | * | 11/1999 | Maas ............................ | 710/52 |
| 6,112,266 A | * | 8/2000 | Yeh .............................. | 710/52 |
| 6,128,308 A | * | 10/2000 | Kuo et al. .................... | 370/428 |
| 6,148,386 A | * | 11/2000 | Rhodes et al. ............... | 711/200 |
| 6,338,112 B1 | * | 1/2002 | Wipfel et al. ............... | 710/269 |
| 6,363,438 B1 | * | 3/2002 | Williams et al. ............ | 710/22 |
| 6,480,912 B1 | * | 11/2002 | Safi .............................. | 710/57 |
| 6,553,448 B1 | * | 4/2003 | Mannion ...................... | 711/2 |
| 6,757,756 B1 | * | 6/2004 | Lanteigne et al. .......... | 710/52 |
| 6,785,752 B2 | * | 8/2004 | Gerhart ........................ | 710/56 |
| 7,107,367 B1 | * | 9/2006 | Hughes ........................ | 710/39 |
| 7,613,848 B2 | * | 11/2009 | Amini et al. ................ | 710/29 |
| 7,689,738 B1 | * | 3/2010 | Williams et al. ............ | 710/52 |
| 7,743,182 B2 | * | 6/2010 | Duisenberg .................. | 710/52 |
| 2003/0149748 A1 | * | 8/2003 | Duisenberg .................. | 709/219 |
| 2009/0049359 A1 | | 2/2009 | Malladi et al. | |

* cited by examiner

*Primary Examiner* — Henry Tsai
*Assistant Examiner* — Jing-Yih Shyu
(74) *Attorney, Agent, or Firm* — Robert C. Rolnik; David A. Mims

(57) ABSTRACT

A computer implemented method for writing to a software bound ring buffer. A network adapter may determine that data is available to write to the software bound ring buffer. The network adapter determines that a read index is not equal to a write index, responsive to a determination that data is available to write to the software bound ring buffer. The network adapter writes the data to memory referenced by the hardware write index, wherein memory referenced by the write index is offset according to an offset, and the memory contents comprise a data portion and a valid bit. The network adapter writes an epoch value of the write index to the valid bit. The network adapter increments the write index, responsive to writing the data to memory referenced by the write index. Further disclosed is method to access a hardware bound ring buffer.

5 Claims, 5 Drawing Sheets

RING BUFFER

BACKGROUND OF THE INVENTION

1. Field of the Invention

The present invention relates generally to a computer implemented method, for flow control in a buffer. More specifically, the present invention relates to controlling communication overhead for flow control of a circular buffer.

2. Description of the Related Art

Modern uses of networked computers leverage network adapters, such as may be implemented with PCI express, to move data between data processing systems. One feature used by network adapters is the ring buffer. A ring buffer is a buffer in a tract of memory with data in a series. If an end to a tract of addresses in memory is reached when writing or reading, then subsequent reads and writes can begin at a second end of the tract of memory.

Ring buffers are stored in system memory or shared memory. Such buffers are often filled by data arriving from a network adapter. Similarly, a ring buffer can be used by a software stack to store data bound for the network adapter. The buffer can be used to accommodate the presence of traffic on the network or bottlenecks in the data processing system by accumulating data during high traffic or bottlenecks. In a sense, each buffer builds a pool of unread data while the corresponding data processing system component is busy. When the corresponding data processing system is able to process the data of the buffer, it reads the data from the buffer.

SUMMARY OF THE INVENTION

The present invention provides a computer implemented method for writing to a software bound ring buffer. A network adapter may determine that data is available to write to the software bound ring buffer. The network adapter determines that a read index is not equal to a write index, responsive to a determination that data is available to write to the software bound ring buffer. The network adapter writes the data to memory referenced by the hardware write index, wherein memory referenced by the write index is offset according to an offset, and the memory contents comprise a data portion and a valid bit. The network adapter writes an epoch value of the write index to the valid bit. The network adapter increments the write index, responsive to writing the data to memory referenced by the write index.

A computer implemented method for writing data to a hardware bound ring buffer is also provided. A processor determines that a shared memory read index is not equal to a shared memory write index. The processor writes data to a buffer location addressed by the shared memory write index, responsive to a determination that the shared memory read index is not equal to the shared memory write index. The processor increments the shared memory write index to form a second shared memory write index.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
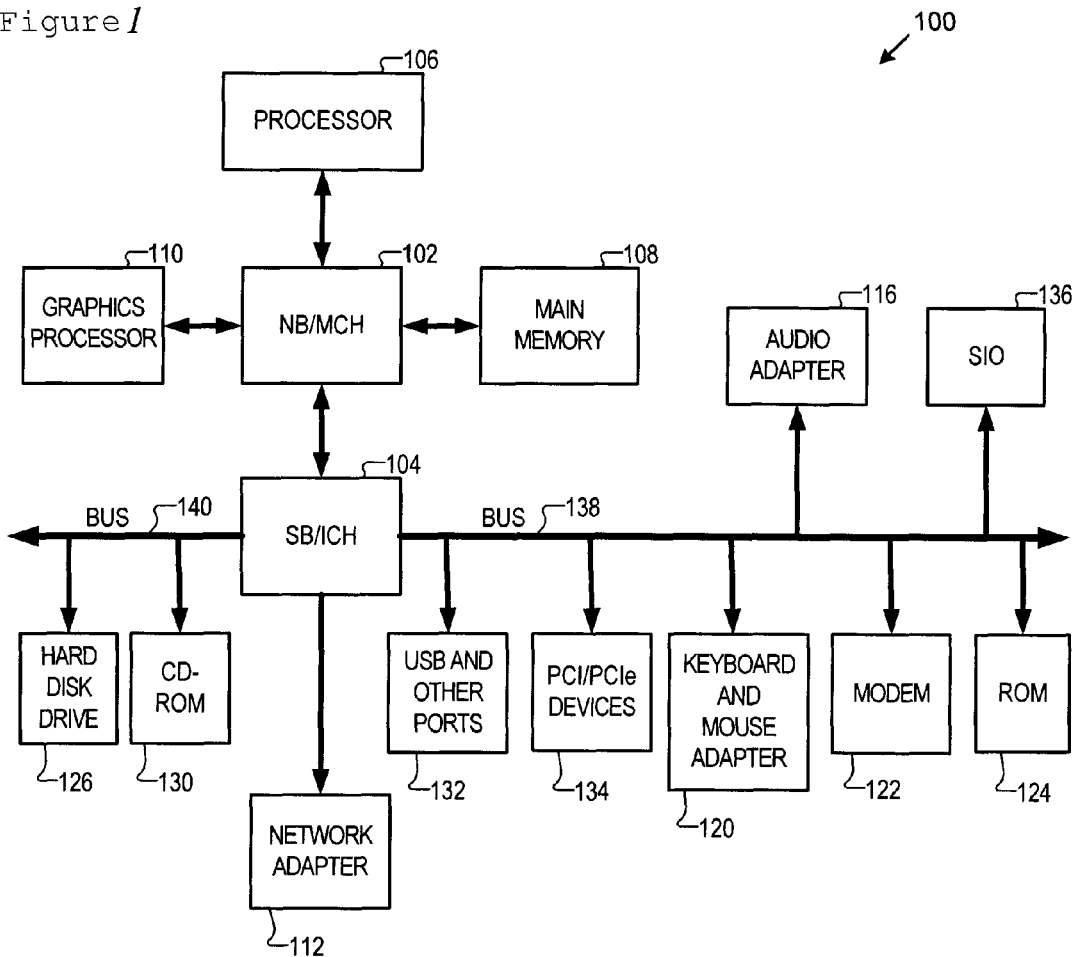
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104. Busses are parallel busses. Thus, bus 138 and bus 140 are parallel busses. A parallel bus is a bus that transmits data signals along the bus along at least four conductors.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for establishing control flow in ring buffers located in system memory. System memory is memory of the data processing system. System memory can include main memory 108 as well as cache memory that may be present in a processor, for example, processor 106 of FIG. 1.

Figure 2:
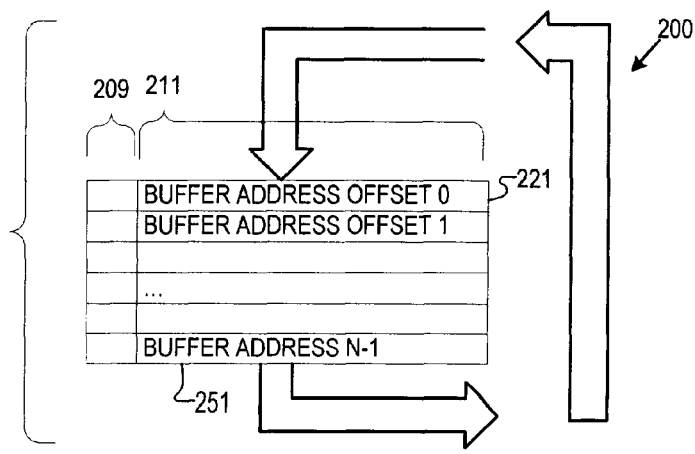
FIG. 2 is a software bound ring in accordance with an illustrative embodiment of the invention.

FIG. 2 is a software bound ring in accordance with an illustrative embodiment of the invention. A software bound ring buffer is system memory allocated to buffering including at least two words. Each memory location or ring buffer element of software bound ring 200 may hold a message that is from a network adapter. A word may be comprised of bytes. Accordingly, a memory location may be two bytes long. A bit in the memory location may be used as a valid bit. In at least one embodiment, the valid bit is the most significant bit in the word. For example, in memory location 221 includes valid bit 209. Thus, apart from the valid bit, each memory location in the software bound ring buffer may hold, for example, values from 0-32767 within 15 bits allocated to an offset portion. The values are stored in data portion 211 of the memory location. A data portion is the part of a ring buffer element that is allocated to holding data. Memory location 221 is at an end of the memory tract. Memory location 251 is at a second end of the memory tract. Buffer locations are addressable memory of the ring buffer. In this case, memory location 221 and memory location 251 are examples of buffer locations.

A valid bit indicates whether a memory location has been read by the processor, or alternatively, is prepared for reading by the processor. Accordingly, a data processing system may not read a bit where the valid bit is the same sense to the corresponding epoch bit. In contrast, the data processing system may read a bit that is the opposite sense or opposite value to the corresponding epoch bit. Accordingly, as an adapter (or hardware) fills a software bound ring buffer, the adapter sets each valid bit of the corresponding memory location to a first setting. Once the adapter reaches the first end of the software bound ring buffer, the adapter may switch the value that it writes in each valid bit for subsequent writes beginning at the other end of the software bound ring buffer. The other end may be memory location 221. This switched value may be the value that the adapter writes until the adapter again reaches the first end of the software ring buffer. The adapter again switches the bit value that it uses to write, thus repeating the cycle of values that the adapter writes to the valid bits. It is appreciated that other embodiments may use a different point in the ring buffer to make the switch in values written to valid bits. The different point may be other than the ends of the ring buffer. In addition an end of a tract of memory is used as an end of a ring buffer.

Figure 3:
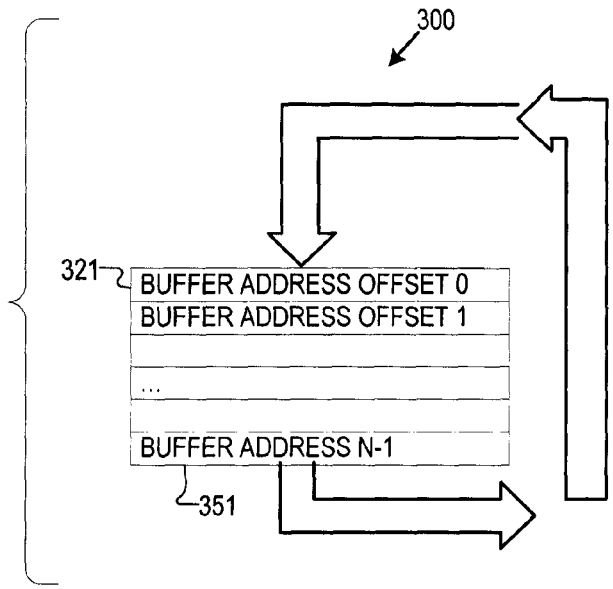
FIG. 3 is a hardware bound ring buffer in accordance with an illustrative embodiment of the invention.

FIG. 3 shows a hardware bound ring buffer in accordance with an illustrative embodiment of the invention. A hardware bound ring buffer is system memory allocated to buffering including at least two words addressable at separate memory locations. Each memory location of hardware bound ring buffer 300 may hold a message that is to or from a network adapter, for example, network adapter 112 of FIG. 1. Each memory location may be two bytes long, and hold values from 0-65535. For example, memory location 321 is at an end of hardware bound ring buffer 300. It may be addressed by an index that is offset 0 into a tract of system or shared memory. Conversely, memory location 351 is at a second end of hardware bound ring buffer 300. It may be addressed by an index that is 511, of FIG. 5, offset into a tract of system memory. Accordingly, an offset or offset portion is a reference that can be used to address physical memory either by use of the offset portion alone, or by adding to the offset portion a base address. Offset portions are described further below, with reference to FIGS. 4 and 7.

Figure 4:
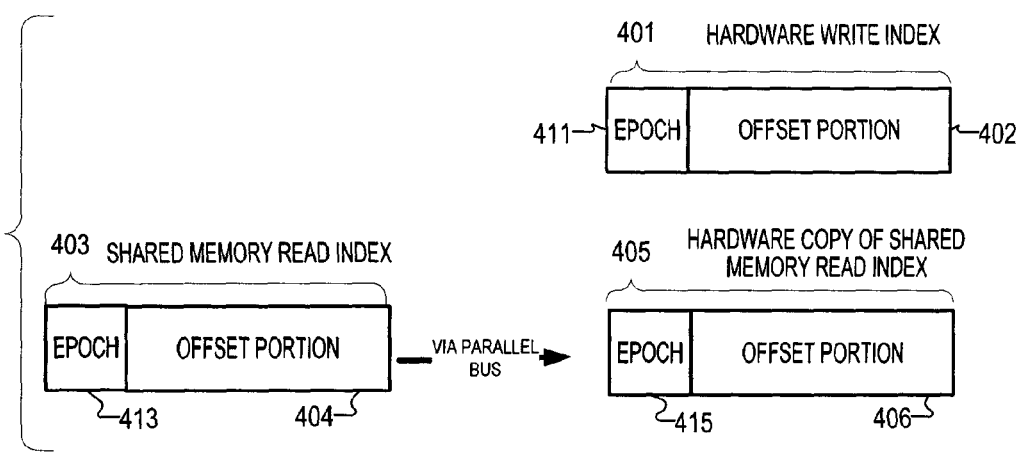
FIG. 4 are the indexes used to control flow through the software bound ring in accordance with an illustrative embodiment of the invention.
Figure 7:
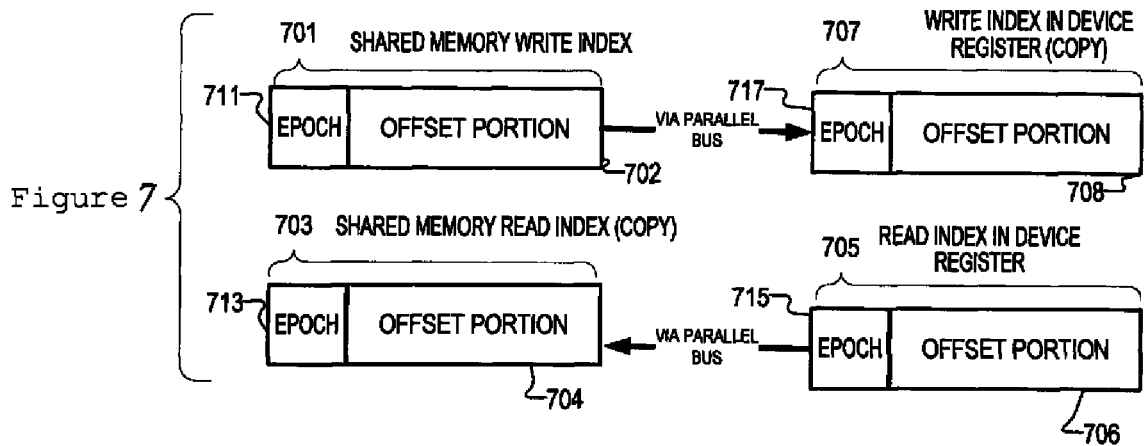
FIG. 7 are the indexes used to control flow through the hardware bound ring buffer in accordance with an illustrative embodiment of the invention.

Each ring buffer of FIGS. 2 and 3 rely on supporting indexes or copies of indexes explained further in relation to FIGS. 4 and 7. The software bound ring buffer and the hardware bound ring buffer may each be allocated memory locations that occupy contiguous memory tracts including N buffer elements, where N is a whole positive number. In other words, N is the number of buffer elements present in the ring buffer. In some embodiments, N may be a whole power of 2. Accordingly, in those embodiments, the ring buffer may hold N messages. However, it is appreciated that in other embodiments, the number of ring buffer elements may be a number other than a whole power of two.

FIG. 4 are the indexes used to control flow through the software bound ring in accordance with an illustrative embodiment of the invention. A read index is a pointer to memory that can be used to determine a place or memory address to begin reading from or a place from which memory was last accessed. Like many indexes, the read index may be used with a base address for additional flexibility. Similarly, a write index is a pointer to memory that can be used to determine a memory address to begin writing from or at which writing had earlier taken place.

A shared memory read index is an index used to lookup memory where the index is stored in shared memory. The index can be used to reference to a software bound ring buffer by adding a base to the shared memory read index to determine a physical location in memory for a buffer element or memory location. For example, shared memory read index 403 includes offset portion 404 and epoch portion 413. An epoch portion is a bit allocated from within a shared memory read index. The epoch portion can store values of 0 or 1 which serve to identify one of two epoch values. An epoch value is a value used to determine if one or more buffer elements of data correspond to a current epoch addressed by some indexes. The epoch value can also operate as a value to set the epoch corresponding to a buffer element.

Additional write indexes for the software bound ring buffer include hardware write index 401 and hardware copy of the shared memory read index 405. Hardware write index 401 includes offset portion 402 and epoch portion 411. A hardware write index is an index that may be used to reference member in a ring buffer, for example, when added to an offset to determine a physical address for each physical element of the ring buffer. Hardware copy of the shared memory read index 405 includes offset portion 406 and epoch portion 415. Both the hardware write index 401 and the hardware copy of the shared memory read index 405 are components within a network adapter. These components can be registers or memory of a network adapter. A hardware copy of the shared memory read index 405 is able to store updates that synchronize to values stored in the shared memory read index 403. Accordingly, from time to time, the hardware copy of the shared memory read index 405 may be a value different than that held in shared memory read index 403. Copies to the hardware copy of the shared memory read index 405 may be coordinated by the network adapter by reading data from shared memory across a parallel bus, for example, parallel bus 138 of FIG. 1.

Figure 5:
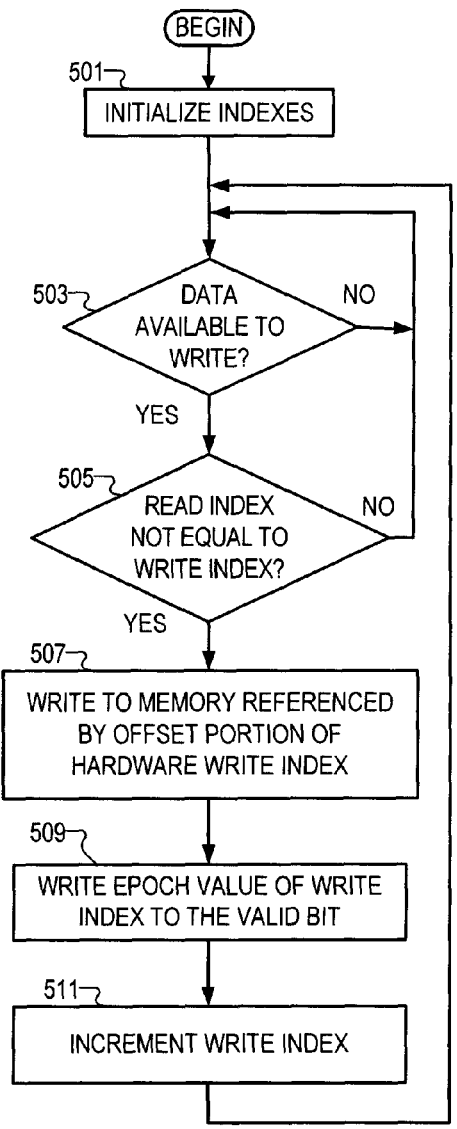
FIG. 5 is a flowchart of writing data to the software bound ring buffer in accordance with an illustrative embodiment of the invention.

FIG. 5 is a flowchart of writing data to the software bound ring buffer in accordance with an illustrative embodiment of the invention. Initially, a network adapter may initialize indexes (step 501). The initialization may include initializing, for example, the hardware write index and the hardware copy of the shared memory read index. Indexing may set the system memory write index and hardware copy of the system memory read index to an end of the tract of memory forming the system memory write index, for example, at an offset 0 into the tract of memory that forms the software bound shared memory.

Next, the network adapter may determine whether data is available to write to the software bound ring buffer (step 503). This step may include receiving an interrupt indicating that data is available to write to the software bound ring buffer.

If data is available to write, the network adapter may determine whether hardware copy of the shared memory read index 405 is not equal to hardware write index 401 (step 505). A negative result to steps 503 or 505 may cause step 503 and optionally step 505 to be repeated. However, a positive result to step 505 may cause the network adapter to write to memory referenced by the offset portion of hardware write index 401 (step 507). To be 'referenced by' means that a processor or a network adapter derives a physical memory address for memory contents based on an index. The actual physical address can be a location in memory reached by adding a base address to the offset portion of the index. Next, or concurrent to step 507, the network adapter may write an epoch value 411 of hardware write index to a valid bit of the memory referenced by hardware write index 401 (step 509).

Next, the network adapter may increment the hardware write index 401 (step 511). Processing may resume at step 503. The hardware write index 401, shared memory read index 403, and hardware copy of shared memory read index 405 may be as described in FIG. 4.

Figure 6:
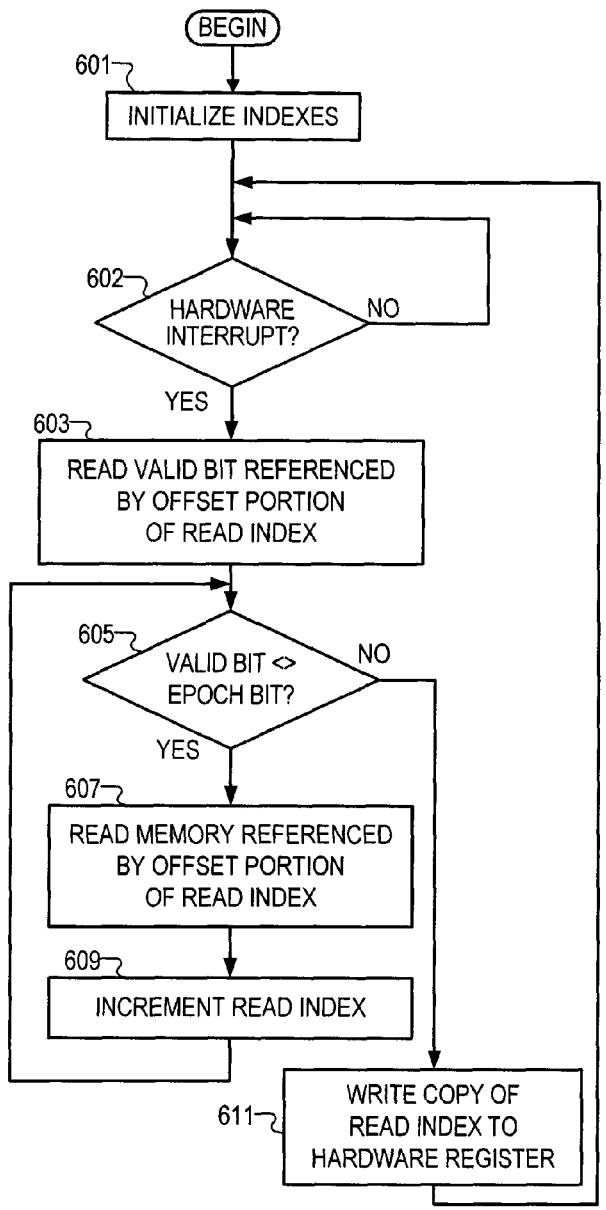
FIG. 6 is a flowchart for reading data from a software bound ring buffer in accordance with an illustrative embodiment of the invention.

FIG. 6 is a flowchart for reading data from a software bound ring buffer in accordance with an illustrative embodiment of the invention. Initially, a processor may initialize indexes (step 601). The processor can be a processor such as processor 106, of FIG. 1. Next, the processor may determine if a hardware interrupt occurred (step 602). A hardware interrupt is a signal generated asynchronously by hardware of a data processing system. If no hardware interrupt occurred, step 602 may repeat. A hardware interrupt can be an indicator that data awaits reading by the processor executing computer instructions. Otherwise, in response to a hardware interrupt, the processor may read a valid bit referenced the offset portion of a read index 403 (step 603). The valid bit is a bit in the software bound ring buffer.

Next, the processor may determine if the valid bit is not equal to an epoch bit (step 605). The epoch bit is stored in system memory as a shared memory read index. Next, the processor may read the software bound ring buffer at the memory location referenced by the offset portion of the read index 403 (step 607). Subsequently, the processor can increment the read index (step 609). The read index can be the shared memory read index 403 of FIG. 4.

Following a negative determination at step 605, the processor may write a copy of read index to a hardware register 405 step 611. The hardware register can be hardware copy of shared memory read index 405. This branch in processing is taken in response to the valid bit being the same as the epoch bit. Accordingly, the processor may write a copy of the shared memory read index to a hardware copy of the software read index. Processing may resume and repeat at step 602.

FIG. 7 are the indexes used to control flow through the hardware bound ring buffer in accordance with an illustrative embodiment of the invention. Some indexes are stored in shared memory. Shared memory is memory of a data processing system that may be used by applications executed by a processor, or may be accessed by components attached to a system parallel bus. A shared memory write index 701 is comprised of an epoch portion 711 and an offset portion 702. Shared memory read index 703 includes epoch portion 713 of shared memory read index and offset portion 704 of the shared memory read index. Both shared memory write index 701 and shared memory read index 703 may be copies that are periodically updated from the contents of write index in device register 707 and read index in device register 705, respectively. Write index in device register 707 is a write index that is physically stored to a device register. The write index in the device register operates as a master write index in that it is updated more frequently than the corresponding shared memory write index 701. Although the write index in device register 707 may be in a register of the hardware, the write index in device register may in alternative embodiments be stored in a memory local to the hardware. By local, it is meant that the memory is physically on the circuit board of the hardware. The write index in device register includes epoch portion 717, and offset portion 708. The read index in device register 705 includes epoch portion 715, and offset portion 706.

Figure 8:
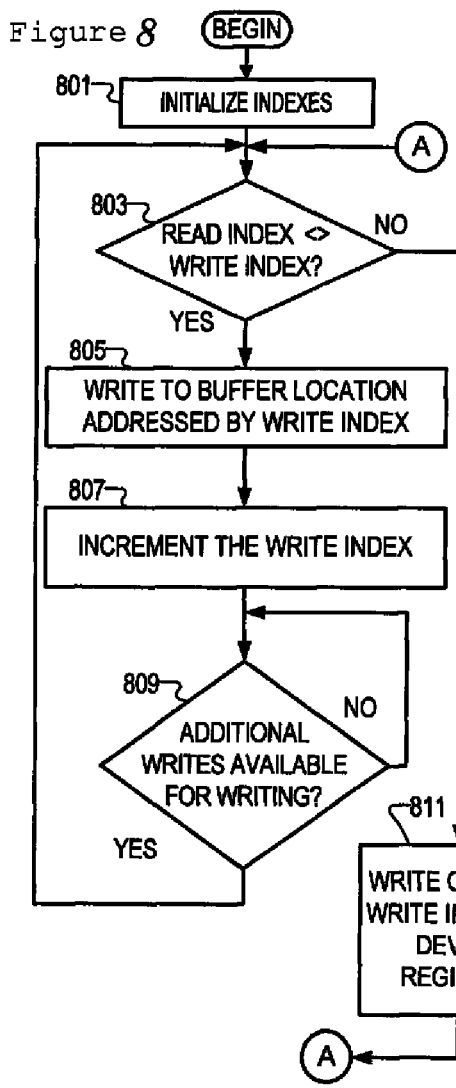
FIG. 8 is a flowchart for writing data to the hardware bound ring buffer in accordance with an illustrative embodiment of the invention.

FIG. 8 is a flowchart for writing data to the hardware bound ring buffer in accordance with an illustrative embodiment of the invention. The hardware ring buffer can be hardware ring buffer 300 of FIG. 3. Initially, the processor may initialize indexes (step 801). These indexes may be shared memory write index 701, shared memory read index 703, write index in device register 707 and read index in device register 705. Next, the processor may determine whether the shared memory read index is not equal to the shared memory write index (step 803). If the result of step 803 is positive, the processor may write data from shared memory to a hardware ring buffer location addressed by the write index (step 805). Next, the processor may increment the shared memory write index (step 807). Incrementing may be performed in a manner to permit sequential writes to occur in sequence in the tract of memory, except that when an end to the tract is reached, writing resumes at the second end of the tract of memory, as described with reference to FIG. 3. Next, the processor may determine whether additional data is available for writing (step 809). Additional data may be made available by the processor executing one or more applications. The processor may be, for example, processor 106 of FIG. 1. A positive result to step 809 may result in the processor resuming at step 803. However, a negative result may result in the processor repeating execution of step 809.

Figure 9:
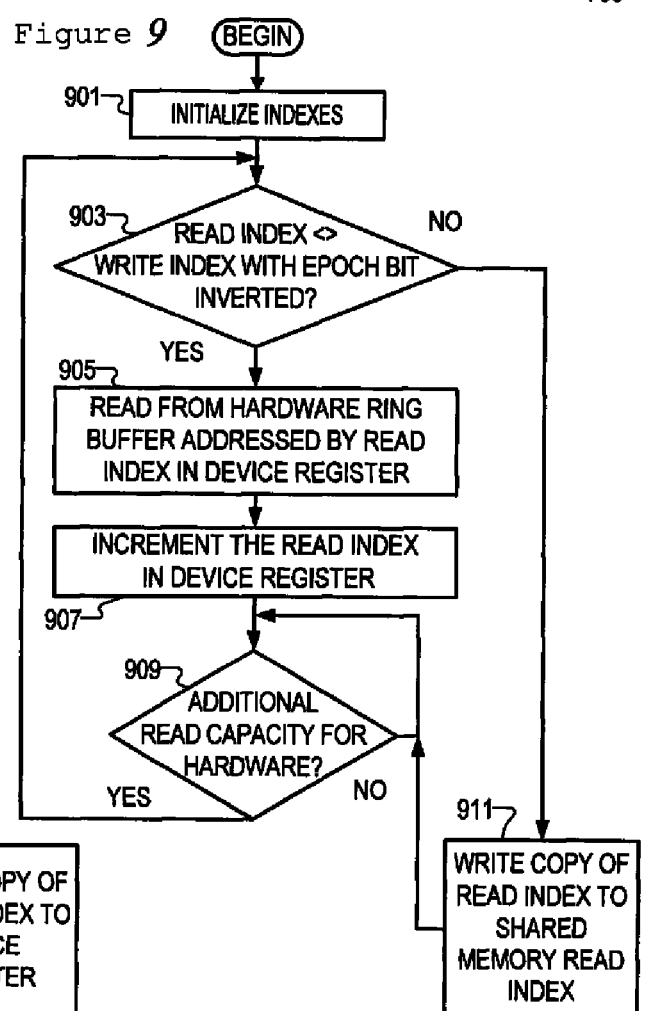
FIG. 9 is a flowchart for reading data from the hardware bound ring buffer in accordance with an illustrative embodiment of the invention.

FIG. 9 is a flowchart for reading data from the hardware bound ring buffer in accordance with an illustrative embodiment of the invention. Initially, a network adapter may initialize indexes (step 901). Next, the network adapter may compare the read index in device register with the write index in device register with the epoch bit inverted (step 903). An inverted epoch bit is a bit that is reversed to the complementary binary value of the epoch bit. The inverted epoch bit may exist separately from the epoch bit and be used in a step of comparing larger units of data, for example, words. In response to a positive outcome to step 903, the network adapter may read from the hardware bound ring buffer addressed by the read index in device register 705, of FIG. 7 (step 905). Next, the network adapter may increment the read index in device register (step 907).

Next, the network adapter may determine whether there is additional read capacity for the hardware (step 909). If not, step 909 may repeat until additional read capacity is present. If additional read capacity for hardware is present, the network adapter may repeat step 903. A negative result at step 903, may result in the network adapter writing the copy of the read index to the shared memory read index (step 911). Processing of the network adapter may resume at step 909.

Figure 10:
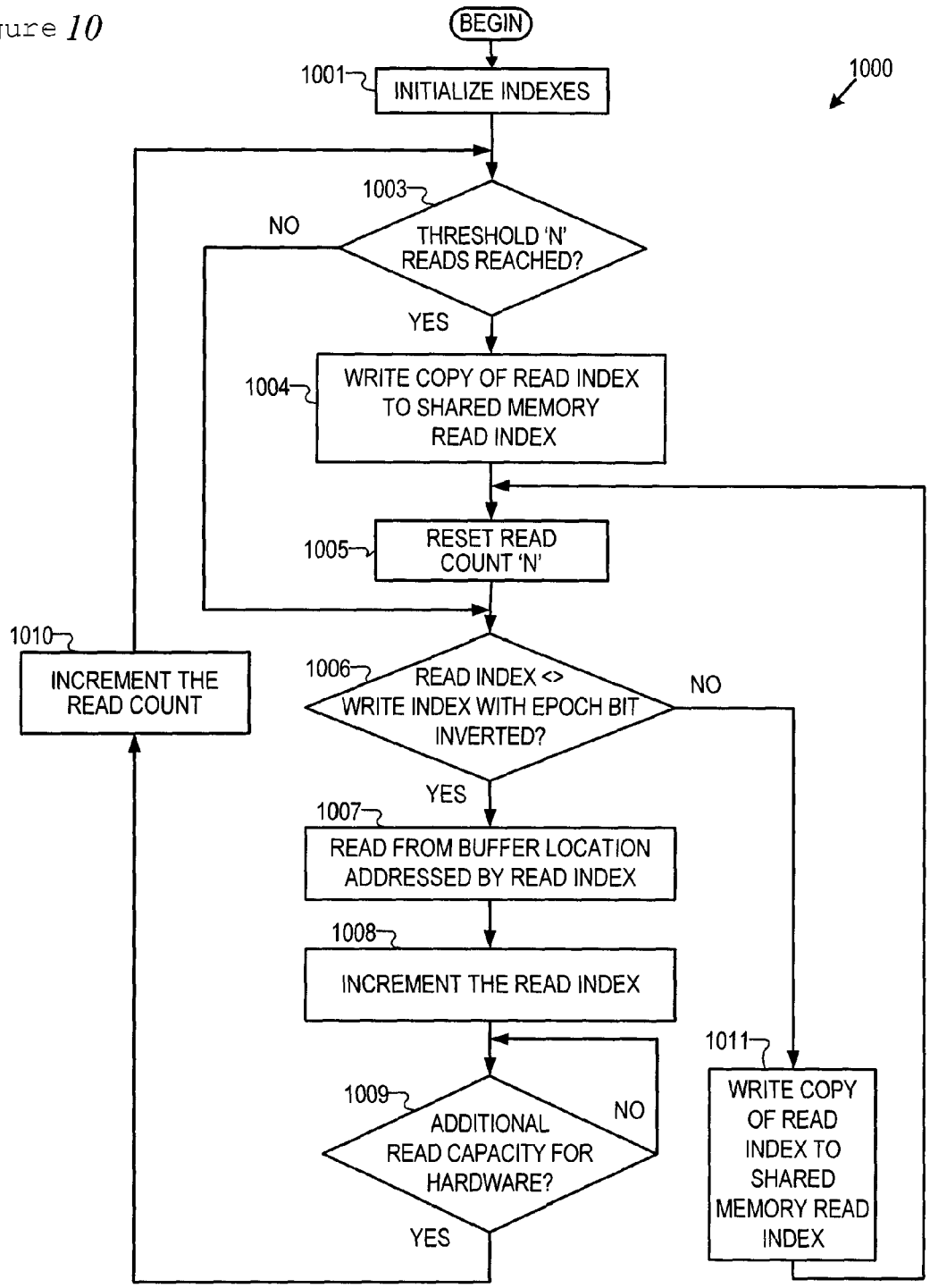
FIG. 10 is a flowchart for reading data from the hardware bound ring buffer in accordance with an illustrative embodiment of the invention.

FIG. 10 is a flowchart for reading data from the hardware bound ring buffer in accordance with an illustrative embodiment of the invention. Use of flowchart 1000 may result in the network adapter writing the copy of the read index to the shared memory read index more frequently than the flowchart depicted in FIG. 9. Initially, a network adapter may initialize indexes (step 1001). The initialization of indexes may include setting a memory location or register that marks the number of buffer elements from which the data recently read. This number or read count may be stored to a counter, 'I', which is set, initially, to 0. The read count is the number of buffer elements written since an earlier event, for example, a writing of a hardware read index to a shared memory read index. Accordingly, a step of resetting read counts may follow each write of a copy of the read index to shared memory.

Thus, a next step is that the network adapter may determine if a threshold, N, reads is reached (step 1003). The threshold number of reads, N, is compared to the read count, I. The threshold number of reads, N, can be a user configured option that suits a preference of the user or computer operator. A threshold number of reads is a number of reads that the network adapter may perform before synchronizing the shared memory copies to equal the values of the corresponding write index in device register and read index in device register. Accordingly, to prepare the network adapter to perform flowchart 1000, a one-time setup of the data processing system may occur. Initially the user may enter his preference. Accordingly, the data processing system may set a register in the network adapter to track the number of hardware bound ring buffer reads that trigger a synchronization or copying of the read index to shared memory.

Accordingly, step 1003 may determine that a threshold number of reads to the hardware ring buffer has occurred without writing a copy of hardware read index to a shared memory read index. In response, the network adapter may write a copy of the read index to the shared memory read index (step 1004). Next, the network adapter may reset the read count, N (step 1005).

A negative result at step 1003 or after step 1005 may result in the network adapter determining whether the read index is not equal to the write index with its epoch bit inverted (step 1006). A positive result may cause the network adapter to read from the buffer location addressed by the read index (step 1007). Next, the network adapter may increment the read index (step 1008). Next, the network adapter may determine if additional read capacity is present for the hardware (step 1009). If no additional read capacity is present, the network adapter may resume checking for capacity at step 1009. However, if additional read capacity exists, the network adapter may increment the read count (step 1010). Processing may resume at step 1003.

A negative response result of step 1006 may cause the network adapter to write a copy of the read index to the shared memory read index (step 1011). Processing may resume at step 1005.

The illustrative embodiments permit data to be placed in a ring buffer and read from a ring buffer with occasional synchronization of states between hardware indexes present on a network adapter and shared memory storage of counterpart indexes. Some embodiments may be a processor of a data processing system executing machine instructions. Other embodiments may include a processor of an adapter, such as a network adapter, that executes machine instructions to access shared memory across a bus within the data processing system. In the second case, the data processing system hosts the adapter by being implemented as a parallel bus architecture to communicate with the adapter. In this manner, both the data processing system and the adapter may share shared memory to carry messages to or from the adapter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reading data from a hardware bound ring buffer, the method comprising:
    determining that a read index is not equal to a write index having an inverted epoch bit, wherein the read index is in a device register;
    responsive to a determination that the read index is not equal to the write index having the inverted epoch bit, reading from a buffer location addressed by the read index;
    incrementing the read index;
    determining that the hardware has additional read capacity;
    receiving a change to a write index in the device register;
    determining that a read index is equal to a write index having an inverted epoch bit; and
    writing a copy of the read index to a read index in shared memory;
    determining that a threshold number of writes to the hardware bound ring buffer have occurred without intervening writes of a copy of hardware read index to the shared memo read index;
    responsive to determining that the threshold number of writes to the hardware bound ring buffer have occurred without intervening writes of the copy of hardware read index to the read index in shared memory, writing the copy of the hardware read index to the shared memory read index;
    receiving a preference for the threshold from a computer operator; and
    setting the threshold number according to the preference.

2. The computer implemented method of claim 1, wherein writing the copy of the read index to the read index in shared memory is responsive to a determination that the read index is equal to the write index having the inverted epoch bit.

3. The computer implemented method of claim 1, wherein the hardware read index is stored in a component of a network adapter.

4. The computer implemented method of claim 2, wherein writing the copy of the read index to the read index in shared memory is performed by a network adapter using a parallel bus to transfer the data.

5. The computer implemented method of claim 1, wherein the hardware bound ring buffer comprises ring buffer elements numbering other than a whole power of two.

* * * * *